(12) United States Patent
Rush, III

(10) Patent No.: US 11,119,071 B1
(45) Date of Patent: Sep. 14, 2021

(54) SYSTEMS AND METHODS FOR CURING, TESTING, VALIDATING, RATING, AND MONITORING THE INTEGRITY OF COMPOSITE STRUCTURES

(71) Applicant: OceanGate, Inc., Everett, WA (US)

(72) Inventor: Richard Stockton Rush, III, Seattle, WA (US)

(73) Assignee: OceanGate, Inc., Everett, WA (US)

( * ) Notice: Subject to any disclaimer, the term of this patent is extended or adjusted under 35 U.S.C. 154(b) by 683 days.

(21) Appl. No.: 15/917,307

(22) Filed: Mar. 9, 2018

Related U.S. Application Data

(60) Provisional application No. 62/470,015, filed on Mar. 10, 2017.

(51) Int. Cl.
*G01N 29/14* (2006.01)
*G01N 29/44* (2006.01)

(52) U.S. Cl.
CPC ......... *G01N 29/14* (2013.01); *G01N 29/4427* (2013.01); *G01N 2291/0231* (2013.01); *G01N 2291/0289* (2013.01); *G01N 2291/02872* (2013.01); *G01N 2291/02881* (2013.01); *G01N 2291/105* (2013.01)

(58) Field of Classification Search
CPC ..................................................... G01N 29/14
USPC .......................................................... 73/587
See application file for complete search history.

(56) References Cited

U.S. PATENT DOCUMENTS

| 3,956,731 A | 5/1976 | Lewis, Jr. |
|---|---|---|
| 4,910,718 A | 3/1990 | Horn |
| 6,443,012 B2 | 9/2002 | Beardmore |
| 7,080,555 B2 | 7/2006 | Austin et al. |
| 7,341,758 B2 | 3/2008 | Stewart et al. |
| 7,571,058 B2 | 8/2009 | Sealing et al. |

(Continued)

OTHER PUBLICATIONS

Aggelis, D.G. et al. Acoustic structural health monitoring of composite materials: Damage identification and evaluation in cross ply laminates using acoustic emission and ultrasonics, Composites Science and Technology, 2012.

(Continued)

*Primary Examiner* — Walter L Lindsay, Jr.
*Assistant Examiner* — Philipmarcus T Fadul
(74) *Attorney, Agent, or Firm* — DWC Law Firm, P.S.

(57) ABSTRACT

Systems and methods relate to testing and/or monitoring acoustic emissions detected at composite structures, such as carbon fiber structures, intended for use in extreme conditions, such as in high pressure conditions, high or low temperature conditions, conditions in which the composite structure is subjected to mechanical impacts, or the like. The systems and protocols are suitable for use with composite structures comprising, e.g., carbon fiber structures, such as hollow or partially hollow structures used in submersible vehicles, spacecraft, gas-fillable storage containers, pressure vessels, and the like, that are subjected to extreme conditions during use. Systems and methods disclosed herein are directed to collecting and analyzing data, determining background conditions, differentiating and classifying signals, conditioning or curing a material or structure, assessing, rating and/or validating the "health" of a material or structure in real-time, determining alarm conditions, predicting failure conditions, and the like.

12 Claims, 1 Drawing Sheet

(56) References Cited

U.S. PATENT DOCUMENTS

| | | | |
|---|---|---|---|
| 7,860,664 B2 | 12/2010 | Loomis et al. | |
| 7,896,613 B2 | 3/2011 | Xiong | |
| 8,515,677 B1* | 8/2013 | Vail | E21B 4/04 |
| | | | 702/12 |
| 8,994,546 B2 | 3/2015 | Breed et al. | |
| 2008/0061959 A1* | 3/2008 | Breed | G01F 23/2962 |
| | | | 340/539.1 |
| 2014/0320298 A1 | 10/2014 | Meiksin | |

OTHER PUBLICATIONS

Rush, Stockton. Cyclops 2 Model Pressure Test Insights, 2016.

\* cited by examiner

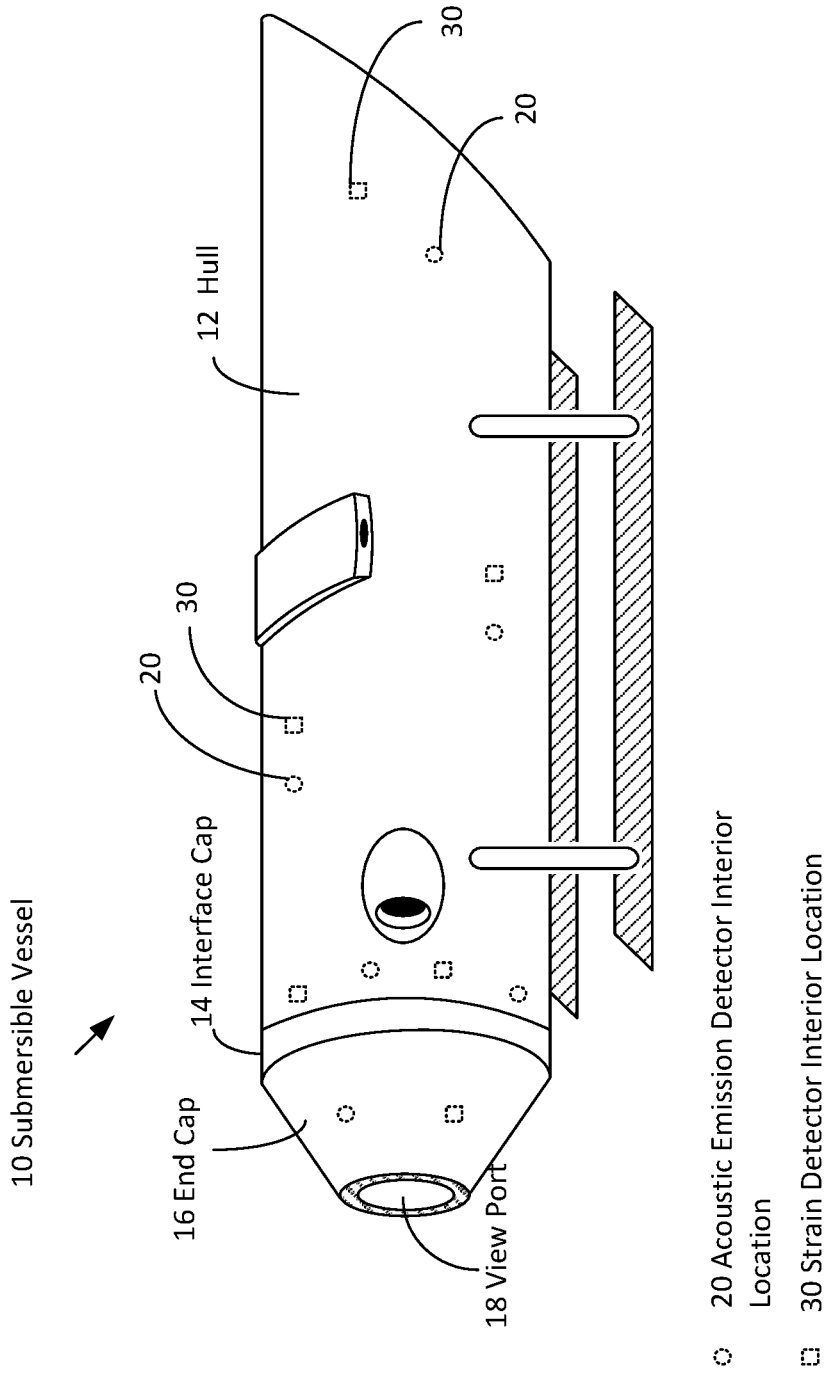

SYSTEMS AND METHODS FOR CURING, TESTING, VALIDATING, RATING, AND MONITORING THE INTEGRITY OF COMPOSITE STRUCTURES

REFERENCE TO RELATED APPLICATION

This application claims the benefit of U.S. provisional patent application No. 62/470,015 filed Mar. 10, 2017.

TECHNICAL FIELD OF THE DISCLOSURE

The present disclosure relates to systems and methods for curing, testing, validating, rating and/or monitoring composite structures such as carbon fiber structures and other types of resin- and fiber-based composite structures. Acoustic emissions monitoring of composite structures is implemented, optionally in combination with monitoring of associated non-composite structures to detect strain or a related measurement. The present disclosure also relates to methods and systems for analyzing data, determining background conditions, assessing and validating the "health" of a composite material or structure, determining alarm conditions, predicting failure conditions, and the like.

BACKGROUND

Acoustic systems have been used to detect acoustic emissions associated with failures during structural fatigue tests. (See, e.g., U.S. Pat. No. 3,956,731.) U.S. Pat. No. 7,860,664 also relates to monitoring physical structures such as composite aircraft parts, and U.S. Pat. No. 6,443,012 discloses the use of several ultrasonic phased arrays bonded to (aircraft) components, with changes in output indicative of weakening of the structure reported to the pilot. Ultrasonically testing near-bondline regions of coated articles to detect, e.g., delamination, is disclosed in U.S. Pat. No. 7,341,758. U.S. Pat. No. 7,080,555 discloses a distributed real-time system for monitoring acoustic emissions from different regions of a structure (e.g., aircraft, spacecraft). U.S. Pat. No. 8,515,677 discloses real-time measurement systems using sensor arrays that measure changes in resistance or resistivity or dielectric properties of the material for detecting the onset of compression-induced microfracturing of fiber-reinforced composites.

SUMMARY DESCRIPTION

In one aspect, systems and methods relate to testing and/or monitoring acoustic emissions detected at composite structures, such as carbon fiber structures, intended for use in extreme conditions, such as in high pressure conditions, high or low temperature conditions, conditions in which the composite structure is subjected to mechanical impacts, or the like. Composite (e.g., carbon fiber) structures such as cylinders and other configurations of hollow or partially hollow structures may be used, for example, in submersible vehicles, spacecraft, gas-fillable storage containers, pressure vessels, and the like, that are subjected to extreme conditions during use. The integrity and safety of such structures generally can't be reliably evaluated using visual or other conventional inspection techniques. Systems and methods disclosed herein are directed to collecting and analyzing data, determining background conditions, differentiating and classifying signals, conditioning or curing a material or structure, assessing, rating and/or validating the "health" of a material or structure, determining alarm conditions, predicting failure conditions, and the like.

In some systems disclosed herein, acoustic emission detectors such as ultrasound transducers may be mounted or affixed to ("associated with") multiple locations on a structure. In some embodiments, acoustic emission detectors are placed at multiple locations on or at a composite structure, as well as at multiple locations at the interface of a composite structure with a structure having another composition (e.g., metal, ceramic, glass, plastic, etc.) In some embodiments, acoustic emissions detectors are additionally placed on or at structures composed of other materials. Acoustic emission detectors and/or strain detectors may be associated with an interior or an exterior portion of the composite structure or may be provided in both interior and exterior locations. The spatial location of each acoustic emissions detector may be mapped or identified, and data may be collected from each acoustic emissions detector at predetermined or selectable intervals and communicated to a centralized system for storage, analysis, etc. In some embodiments, systems of the present invention include a distributed collection of acoustic emissions detectors, such as ultrasound transducers, associated or associate-able with a composite structure. In some embodiments, each detector of a distributed array of acoustic emissions detectors is in operable communication with a data storage and/or processing facility, such as a remote or centralized host processing system.

In some embodiments, strain detectors such as strain gauges are used independently of or in combination with acoustic emissions detectors. Many types of composite structures that are exposed to extreme conditions during operations additionally include components comprising metallic materials, other types of composite materials, glass, plastics (e.g., acrylics), and the like. The stresses experienced by these types of materials, and the stresses experienced at the interfaces of these materials with composite structures may be detected and measured using strain detectors such as strain gauges, for example. The spatial location of each strain detector may be identified, and data may be collected from each strain detector at predetermined or selectable intervals and communicated to a centralized system for storage, analysis, etc. In some embodiments, systems of the present invention include a distributed collection of strain detectors, alone or in combination with a distributed collection of acoustic emissions detectors, such as ultrasound transducers, all associated or associate-able with a composite structure.

BRIEF DESCRIPTION OF THE DRAWINGS

FIG. 1 illustrates an example submersible vessel.

When reference is made herein to acoustic data, strain data and other types of data, it will be appreciated that the data may relate to acoustic emission and/or strain data and measurements, the magnitude and/or frequency of acoustic emissions, as well as their derivatives (e.g., rate of onset of acoustic emission and/or strain events, the change in rate of onset of acoustic emission and/or strain events, rate of change of magnitude and/or frequency of acoustic emissions, etc.), and other measurements or parameters that relate to acoustic emissions and strain data and their derivatives. In some embodiments, acoustic data may comprise or consist of the squares of measured amplitudes of acoustic sensors.

DETAILED DESCRIPTION

Referring to FIG. 1, which illustrates an example submersible vessel. FIG. 1 further shows outlines of interior locations of detectors. As illustrated, the submersible vessel 10 includes a hull 12, an interface cap 14, an end cap 16, and a view port 18, among other things. The hull 12, the interface cap 14, the end cap 16, and the view port 18 may make up at least a portion of the external structure of the submersible vessel 10. The hull 12 may be a composite structure made of a composite material, while the interface cap 14 and the end cap 16 (as well s view port 18) may be made of other types of materials (e.g., metal, glass, ceramic, plastic, etc.). For example, in some cases, the interface cap 14 and end cap 16 may be made of Titanium. Illustrated in FIG. 1 are outlines of interior locations of acoustic emissions detectors 20 and outlines of interior locations of strain detectors 30. That is, and as previously alluded to, acoustic emission detectors and strain detectors may be provided in the interior portions of the external structure of the submersible vessel 10. Note that the outlines of the locations of the acoustic emissions detectors 20 and the strain detectors 30 illustrated in FIG. 1 are not meant to illustrate the actual size or form of such detectors, but instead, only meant to show example locations of the interior portions of the external structure of a submersible vessel where detectors may be placed.

As described above, in some embodiments, systems and methods are provided for testing and/or monitoring acoustic emissions detected at composite structures, such as carbon fiber structures, intended for use in extreme conditions, such as in high pressure conditions, high or low temperature conditions, conditions in which the composite structure is subjected to mechanical impacts, or the like. In one embodiment, systems and methods are directed to testing and/or monitoring acoustic emissions detected at composite structures configured as submersible vessels, such as manned and unmanned vessels or vehicles configured to safely descend to underwater depths of at least 500 m. In some embodiments, such submersible vessels are provided with an integrated real-time health monitoring system comprising a plurality of acoustic sensors alone, or in combination with other types of sensors, such as strain detectors. Utilizing a plurality of acoustic sensors and a plurality of strain detectors co-located throughout the pressure boundary, the real-time monitoring system makes it possible to analyze the effects of changing pressure on the vessel as the submersible dives deeper, accurately assessing the continuing integrity of the structure on a real-time basis. Programmed alarms and notifications may be implemented to alert an operator when and if the vessel, or a component of the vessel, is compromised or in a potentially unsafe condition.

In some embodiments, acoustic and/or strain measurements for any current submersible activity are compared to acoustic and/or strain measurements established as signature or typical measurements at any particular depth and/or for any particular hull or composite characteristic. In other embodiments, acoustic and/or strain measurements for any current submersible activity are compared to acoustic and/or strain measurements established during one or more previous activities. Thus, for example, one real-time hull safety protocol involves acquiring acoustic and/or strain measure data at a plurality of hull locations at a predetermined or programmed frequency, such as at a time-based or depth-based frequency. In some embodiments, for example, acoustic emissions detectors have a center frequency of 150 kHz. Real-time acoustic and/or strain measurements may be used in their unaltered form or in a derivative or manipulated form for purposes of comparison. In one embodiment, for example, the magnitude of real-time acoustic measurements is squared for purposes of comparison.

Because the composition, configuration and structure of each vessel hull is unique, even as compared to similar vessel hulls, and because the accessories and amenities provided in association with each vessel hull may differ, each individual composite structure (e.g., each vessel hull) may exhibit unique acoustic and/or strain signatures, or unique and localized acoustic and/or strain signatures. In some embodiments, methods and systems as described herein compare real-time acoustic and/or strain measurements acquired during a current operation with acoustic and/or strain measurements acquired during a previous operation of the same composite structure (e.g., vessel). Thus, during a real-time hull safety monitoring protocol, which would be conducted substantially continuously during a submersible dive or retrieval, for example, real-time measured acoustic and/or strain values (or related values or derivatives thereof) are compared, for example, to values acquired during a previous operation (e.g., dive or submersion) of that submersible vessel, with real-time values at specified vessel depths, compared to real-time values at the same or similar vessel depths acquired during a previous dive of that vessel. In some embodiments, real-time acoustic and/or strain values are compared to an average (arithmetic or weighted) of real-time values acquired at corresponding depths during a plurality of previous activities undertaken by the same structure. Real-time measured values that exceed the corresponding previously measured acoustic and/or strain values by a predetermined threshold amount (e.g., that exceed, that exceed by at least 2% or 5% or 10% or the like). When an alarm or notification condition arises, the operator is notified and is able to abort the activity or take remedial action.

In some aspects, methods and systems disclosed herein relate to establishing acoustic emissions signatures and profiles for specific composite structures, as well as to identifying background acoustic emissions filter parameters for specific composite structures. Different composite materials, different composite structure configurations (e.g., large or small diameter structures, different structure thicknesses, etc.), different composite material compositions and structures (e.g., resin composition and structure, fiber composition, structure and orientation, etc.), produce different acoustic signatures and/or waveforms during use, and different test parameters, validation parameters, limit parameters, alarm parameters, and the like, are appropriate depending on the composite material, structure, configuration and the like. In some aspects, methods and systems disclosed herein provide real-time, in situ, non-destructive testing, inspection and monitoring of composite structures, as well as real-time, in situ, non-destructive establishment and updating of test and validation parameters, limit and alarm parameters, and the like for composite structures. In some aspects, methods and systems disclosed herein provide real-time, in situ, non-destructive testing, inspection and rating of composite structures.

In some situations, acoustic emissions signatures, waveforms and events are detectable and may be monitored for different materials or structures forming the composite. In one exemplary embodiment, a composite structure may comprise one or more types or structures of fibers embedded in a resin structure, such as axial fibers, circumferential fibers, and the like. Acoustic signatures and/or waveforms for circumferential fibers, axial fibers and resin may be determined and detected, independently, for composite structures, and analysis of acoustic emission signals (e.g., waveforms) can be used to characterize and differentiate acoustic emissions attributable to different components of a composite structure. Analysis of acoustic emissions waveforms can differentiate, for example, between observed acoustic emissions resulting from fiber breaks vs. observed acoustic emissions resulting from resin structure events or laminar failures, and the like. This data is useful in assessing the condition of composite structures, validating and rating composite structures, predicting failures, and the like.

When testing and validation of composite (e.g., carbon fiber) structures is performed in situ, such as underwater or in the atmosphere or in space, other types of acoustic events unrelated to the structure itself are observed resulting, for example, from the structure interfacing with marine life, bird or insect life, atmospheric materials, particles, and the like. Likewise, during operation of composite structures, these types of environmental interactions are picked up by the acoustic monitoring system and can be identified, characterized and differentiated based on characteristic acoustic signatures and/or waveforms, and their effect (or not) on the acoustic emissions profile and integrity of the composite structure itself may be determined and assessed. Differentiating acoustic emission signals resulting from environmental conditions from acoustic signals attributable to the composite structure can be important in assessing the condition of composite structures, validating composite structures, predicting failures, and the like. Thus, in one aspect, systems and methods disclosed herein are directed to differentiating acoustic emission signals resulting from environmental conditions from acoustic signals attributable to the composite material and structure.

Protocols for establishing acoustic signatures and/or waveforms and non-destructive acoustic background levels and acoustic filter parameters for any particular composite material, structure and/or any particular environmental condition may involve subjecting the composite structure to known, predetermined stress (e.g., pressure and/or temperature) and environmental conditions for known time periods and observing and recording acoustic emission results. Establishing acoustic signatures and/or waveforms and non-destructive acoustic background levels and parameters may involve testing and acoustic emission collection under a variety of test protocols, including known pressure and/or temperature conditions, known change and rate of change of pressure and/or temperature conditions, known environmental conditions, known spatial location on the structure of acoustic emissions, and the like. Known spatial locations of acoustic emission data may be determined using known location of acoustic detectors alone or in combination with triangulation techniques.

In some aspects, methods and systems disclosed herein are useful for treating, or curing, composite structures. Distinctive acoustic emissions readings and/or waveforms observed during testing of hollow carbon fiber composite structures (e.g., cylinders) as pressures are ramped up are indicative of a composite seasoning or curing process rather than failure conditions. In one curing protocol for composite structures (and, especially, for hollow or partially hollow carbon fiber structures), the structure is subjected to increasing pressure conditions to a first pressure set point, or until a predetermined level or profile of acoustic emissions is observed (e.g., a predetermined signal magnitude and/or frequency, or an interval during which a predetermined signal magnitude and/or frequency is observed). Following attainment of the first pressure set point, the structure is subjected to a reduction in pressure conditions until a predetermined level or profile of acoustic emissions is observed (e.g., a predetermined lower signal magnitude and/or frequency, or a predetermined interval during which a lower signal magnitude and/or frequency is observed). Following this return to lower level acoustic emissions, the structure is again subjected to increasing pressure conditions until it reaches a second pressure set point greater than the first, or until a predetermined level or profile of acoustic emissions (e.g., a predetermined signal magnitude and/or frequency, or an interval during which a predetermined signal magnitude and/or frequency) is observed. This ramping up of pressure to successively higher levels followed by reduction in pressure until stable acoustic emissions are achieved may take place iteratively until a desired pressure condition or limit is reached and stable acoustic emissions are achieved at the desired pressure condition or limit, indicating that the composite material and structure is stable at the desired pressure condition. In most circumstances, composite materials and structures are cured, tested and validated to achieve stability under higher pressure conditions than the composite structure is anticipated to observe under normal operating conditions.

Tests were conducted and test result obtained from one exemplary test protocol illustrating this type of pressure ramping up followed by ramping down protocol for a cylindrical carbon fiber structure. In this protocol, the pressure was ramped up to 5000 psi, the pressure was reduced, and then increased to 5,500 psi. Acoustic emissions of increasing frequency and magnitude were observed during the pressure increase from 5,000 to 5,500 psi. The pressure was held at 5,500 psi for an interval, during which the frequency and magnitude of acoustic emissions declined and stabilized. The pressure was then reduced for an interval, followed by an increase, again, to 5,500 psi. The pressure was then ramped up to 6,000 psi, and acoustic emissions of increasing frequency and magnitude were observed during this increase.

Composite material and structure failure conditions may also be detected and characterized using similar acoustic testing protocols. Distinctive acoustic emissions signatures and waveforms present prior to material and structure failure and can be distinguished from "normal" composite material settling, stress, reaction to environmental conditions, and the like. In some aspects, systems and methods disclosed herein involve real-time acoustic monitoring of a structure, filtering background acoustic signals, and establishing/detecting an acoustic "signature" that predicts compromised structural integrity or a potential composite failure condition. The acoustic signature predictive of a material compromise or potential failure may include a large magnitude, high frequency acoustic burst followed by a sustained interval of acoustic signals of slightly lower magnitude and high frequency, but still well above a predetermined healthy structure condition. Thus, a structure alert condition and signal doesn't necessarily depend on an acoustic signal having a predetermined magnitude, but rather it may be characterized by an unusually high magnitude or frequency signal or series of such signals followed by an interval of possibly lower magnitude but sustained frequency acoustic emission signals. Various levels of alarm conditions may be determined and used to notify a pilot, crew, etc. of potential structural damage and/or failure.

Systems and methods disclosed herein are also directed to determining and assessing the health and integrity of composite structures. In many embodiments, the systems and methods rely on collection of real-time acoustic emission data from a distributed collection or array of acoustic data collectors (e.g., ultrasound transducers), alone or in combination with other real-time data (e.g., strain data, or data relating to strain or deformation of a material). Storage of acoustic (and, optionally other) data collected over time and during multiple structure operations (e.g., over the course of multiple subsea dives, multiple aerospace missions, multiple structure uses, etc.) and analysis of multiple data sets collected over the course of multiple activities or missions can be important. The acoustic (and other) signature(s) of composite structures may change over time, over the course of multiple structure uses, with exposure to different types of conditions, as a result of (potentially otherwise undetectable) damage, and in other conditions. In one aspect, systems and methods relating to collecting data over the course of multiple structure uses and establishing structure validation parameters, safety parameters, background conditions, and determining healthy structure conditions, alarm conditions, predicting failure conditions, and the like, for any future event (e.g., submersible dive, aerospace mission, structure use, etc.) based on data collected over the course of multiple previous missions. In this scenario, predetermined parameters used for any particular upcoming event may be established prior to the event and may differ from parameters used for any particular previous mission.

In some embodiments, systems and methods provide real-time acoustic monitoring of a structure, filtering background acoustic signals (etc.), and saving the time-related acoustic emissions measurements in relation to another parameter or parameters. For composite structures that are used in underwater conditions, additional parameters of interest may include (subsea) depth, temperature, pressure, salinity, etc. For composite structures that are used in atmospheric or outer space conditions, additional parameters of interest may include elevation, temperature, pressure, ambient gas content, and the like.

I claim:

1. A system, comprising:
a plurality of acoustic emission detectors placed at multiple spatial locations associated with a composite structure, wherein each of the acoustic emission detectors is in operable communication with a data storage facility and a data processing facility, and wherein the data processing facility is configured analyze acoustic emissions data collected over the course of multiple composite structure uses and establish at least one of the following based on acoustic emissions data collected over the course of multiple composite structure uses: composite structure validation parameters; composite structure safety parameters; environmental acoustic emissions background levels and conditions, healthy composite structure acoustic emissions profiles, composite structure alarm conditions, composite structure failure conditions;
wherein the data processing facility stores previously acquired acoustic emissions measurements acquired during one or more previous activities and the previously acquired acoustic emissions measurements are categorized by at least one of depth, pressure and temperature; and
wherein the composite structure forms a component of a submersible vessel that is submerged under the control of an operator during a current operation, and wherein the data processing facility is configured to compare real-time acoustic emissions measurements acquired at specific depths and/or pressures during the current operation with previously acquired acoustic emissions measurements acquired during a previous operation of the submersible vessel at corresponding specific depths and/or pressures.

2. The system of claim 1, wherein the composite structure is associated with a structure having another composition, and wherein at least one strain detector is located at least at one spatial location in proximity to an interface of the composite structure with the structure having another composition.

3. The system of claim 2, comprising a plurality of acoustic emission detectors placed at multiple spatial locations associated with the composite structure, and a plurality of strain detectors placed at multiple spatial locations associated with the interface of the composite structure with the structure having another composition.

4. The system of claim 1, wherein the composite structure forms a component of a submersible vessel.

5. The system of claim 1, wherein the data processing facility is configured to identify acoustic emissions signatures and/or waveforms and non-destructive acoustic emissions background levels for any particular composite material, structure and/or any particular environmental condition.

6. The system of claim 1, wherein the data processing facility is additionally configured to trigger an alarm or notification when a real-time acoustic emission measurement acquired at a specific depth and/or pressure during the current operation exceeds the previously acquired acoustic emission measurement acquired during the previously operation of the submersible vessel at the corresponding specific depth and/or pressure.

7. The system of claim 6, wherein the data processing facility is additionally configured to trigger an alarm or notification when a real-time acoustic emission measurement acquired at a specific depth and/or pressure during the current operation exceeds the previously acquired acoustic emission measurement acquired during the previously operation of the submersible vessel at the corresponding specific depth and/or pressure by an amount of at least 5%.

8. The system of claim 1, wherein the data processing facility is additionally configured to trigger an alarm or notification when a real-time strain measurement acquired at a specific depth and/or pressure during the current operation exceeds the previously acquired strain measurement acquired during a previous operation of the submersible vessel at the corresponding specific depth and/or pressure.

9. The system of claim 1, wherein the composite structure is in the form of a hollow or partially hollow structure.

10. The system of claim 9, wherein the composite structure is in the form of a pressure vessel.

11. The system of claim 1,
wherein the data processing facility stores previously acquired acoustic emissions measurements acquired during one or more previous activities and the previously acquired acoustic emissions measurements are categorized by at least one of depth, pressure and temperature; and
wherein the data processing facility stores an average of previously acquired acoustic emissions measurements acquired during a plurality of previous activities and the average previously acquired acoustic emissions measurements are categorized by at least one of depth or pressure or temperature.

12. A system, comprising:
a plurality of acoustic emission detectors placed at multiple spatial locations associated with a composite structure, wherein each of the acoustic emission detectors is in operable communication with a data storage facility and a data processing facility, and wherein the data processing facility is configured analyze acoustic emissions data collected over the course of multiple composite structure uses and establish at least one of the following based on acoustic emissions data collected over the course of multiple composite structure uses: composite structure validation parameters; composite structure safety parameters; environmental acoustic emissions background levels and conditions, healthy composite structure acoustic emissions profiles, composite structure alarm conditions, composite structure failure conditions;

wherein the data processing facility stores previously acquired strain measurements acquired during one or more previous activities and the previously acquired strain measurements are categorized by at least one of depth, pressure and temperature; and wherein the composite structure forms a component of a submersible vessel that is submerged under the control of an operator during a current operation, and wherein the data processing facility is configured to compare real-time strain measurements acquired at specific depths and/or pressures during the current operation with previously acquired strain measurements acquired during a previous operation of the submersible vessel at corresponding specific depths and/or pressures.

* * * * *